(12) United States Patent
Iwase

(10) Patent No.: US 7,824,114 B2
(45) Date of Patent: Nov. 2, 2010

(54) MIRROR DEVICE OF SINGLE-LENS REFLEX CAMERA

(75) Inventor: Shigeru Iwase, Akishima (JP)

(73) Assignee: Olympus Imaging Corp., Tokyo (JP)

( * ) Notice: Subject to any disclaimer, the term of this patent is extended or adjusted under 35 U.S.C. 154(b) by 138 days.

(21) Appl. No.: 12/233,234

(22) Filed: Sep. 18, 2008

(65) Prior Publication Data

US 2009/0097838 A1    Apr. 16, 2009

(30) Foreign Application Priority Data

Oct. 16, 2007    (JP)    ............................. 2007-269538

(51) Int. Cl.
*G03B 19/12*    (2006.01)
(52) U.S. Cl. ...................................... 396/358; 396/354
(58) Field of Classification Search ................. 396/354, 396/358
See application file for complete search history.

(56) References Cited

U.S. PATENT DOCUMENTS

| | | | | |
|---|---|---|---|---|
| 4,320,945 A | * | 3/1982 | Kimura | ...................... 396/272 |
| 4,431,285 A | * | 2/1984 | Kajita et al. | ................. 396/272 |
| 6,169,856 B1 | * | 1/2001 | Sakamoto et al. | ........... 396/111 |
| 6,183,142 B1 | * | 2/2001 | Sakamoto et al. | ........... 396/358 |
| 7,654,754 B1 | * | 2/2010 | Lakey | ......................... 396/354 |

FOREIGN PATENT DOCUMENTS

| | | |
|---|---|---|
| JP | 06-175223 | 6/1994 |
| JP | 2006-189539 | 7/2006 |

* cited by examiner

*Primary Examiner*—Rodney E Fuller
(74) *Attorney, Agent, or Firm*—Straub & Pokotylo; John C. Pokotylo

(57) ABSTRACT

The mirror device of a single-lens reflex camera according to the present invention includes a main mirror section having a reflecting mirror surface that moves to a first position for reflecting an object beam to an observation optical system and to a second position retracted from the object beam, a sub-mirror section having a reflecting mirror surface located, in conjunction with movement of the main mirror section, at a position apart from the main mirror section when the main mirror section is located at the first position and at a position retracted from the object beam together with the main mirror section when the main mirror section is located at the second position, and a cushioning section interposed between the sub-mirror section and the main mirror section when the main mirror section moves from the first position to the second position.

5 Claims, 4 Drawing Sheets ns

MIRROR DEVICE OF SINGLE-LENS REFLEX CAMERA

CROSS REFERENCE TO RELATED APPLICATION

This application claims benefit of Japanese Application No. 2007-269538 filed on Oct. 16, 2007 the contents of which are incorporated by this reference.

BACKGROUND OF THE INVENTION

1. Field of the Invention

The present invention relates to a structure of a mirror device of a single-lens reflex camera.

2. Description of the Related Art

A single-lens reflex camera is configured to take a picture based on an object beam incident from a taking lens and observe the object based on the object beam incident from the taking lens. The single-lens reflex camera is generally provided with a quick return mirror as a mirror device that temporally changes whether to direct the object beam from the taking lens to an image taking side such as a film or image pickup device side, or an observing side.

When the position of the quick return mirror is changed, the single-lens reflex camera may have a problem that the quick return mirror bounds by a shock and the bounding quick return mirror appears in a photograph. Furthermore, when the quick return mirror bounds, there may also be a problem that since the camera cannot catch up with high-speed mirror drive, continuous exposure performance cannot be sped up.

A common method for avoiding this problem is to provide a cushioning material at a positioning location of the quick return mirror and suppress bounding of the quick return mirror.

Many cameras released on the market in recent years have an auto-focus (AF) mechanism and a typical example of the AF mechanism provided for a single-lens reflex camera is a TTL phase contrast AF. A single-lens reflex camera capable of the TTL phase contrast AF generally has a structure as follows.

A part of a main mirror is configured as a semi-transmissive portion which is pivotable between a mirror down position where an object beam from a taking lens is reflected and a mirror up position retracted from the object beam. A sub-mirror for reflecting the object beam that has passed through the semi-transmissive portion at an observation position is provided on a rear side of the semi-transmissive portion and a distance measuring sensor for phase contrast AF is arranged on an optical path of the object beam reflected by the sub-mirror. When the main mirror is at the mirror up position, the sub-mirror is configured so as to be folded along the main mirror and retracted from the object beam.

As a technique of suppressing the bounding of the quick return mirror made up of the main mirror and sub-mirror, for example, Japanese Patent Application Laid-Open Publication No. 6-175223 discloses a technique of attracting the quick return mirror by a timing-controlled electromagnet.

SUMMARY OF THE INVENTION

In order to achieve the above described object, a mirror device of a single-lens reflex camera according to the present invention includes a main mirror section having a reflecting mirror surface that moves to a first position for reflecting an object beam to an observation optical system and to a second position retracted from the object beam, a sub-mirror section having a reflecting mirror surface located, in conjunction with movement of the main mirror section, at a position apart from the main mirror section when the main mirror section is located at the first position and at a position retracted from the object beam together with the main mirror section when the main mirror section is located at the second position and a cushioning section interposed between the sub-mirror section and the main mirror section when the main mirror section moves from the first position to the second position.

The above and other objects, features and advantages of the invention will become more clearly understood from the following description referring to the accompanying drawings.

DETAILED DESCRIPTION OF THE PREFERRED EMBODIMENTS

Hereinafter, an embodiment of a lens replacement type single-lens reflex camera to which the present invention is applied will be explained with reference to the accompanying drawings.

Figure 1:
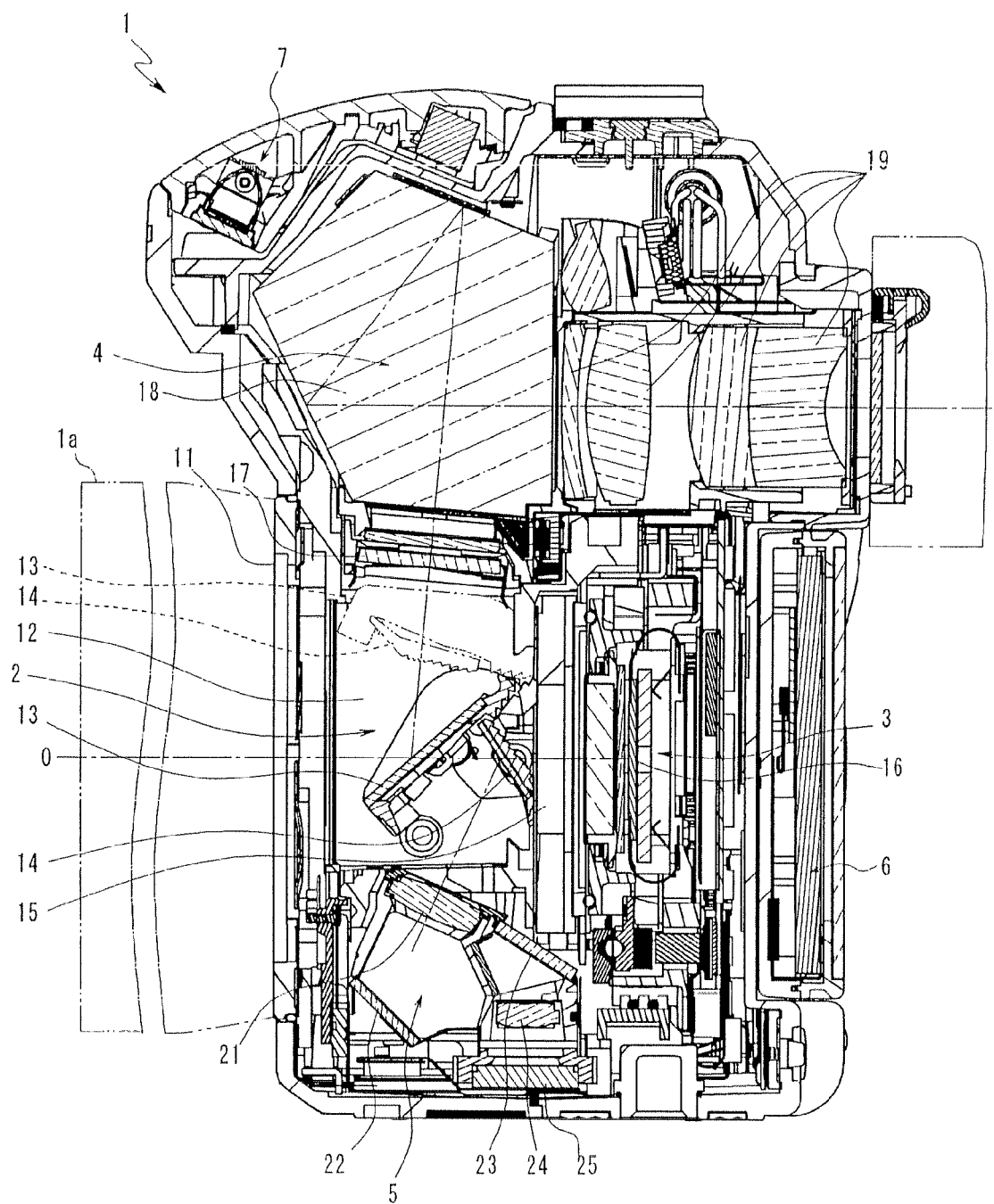
FIG. 1 shows a schematic configuration of a body of a single-lens reflex camera.
Figure 1:
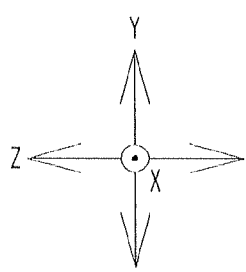
Figure 2:
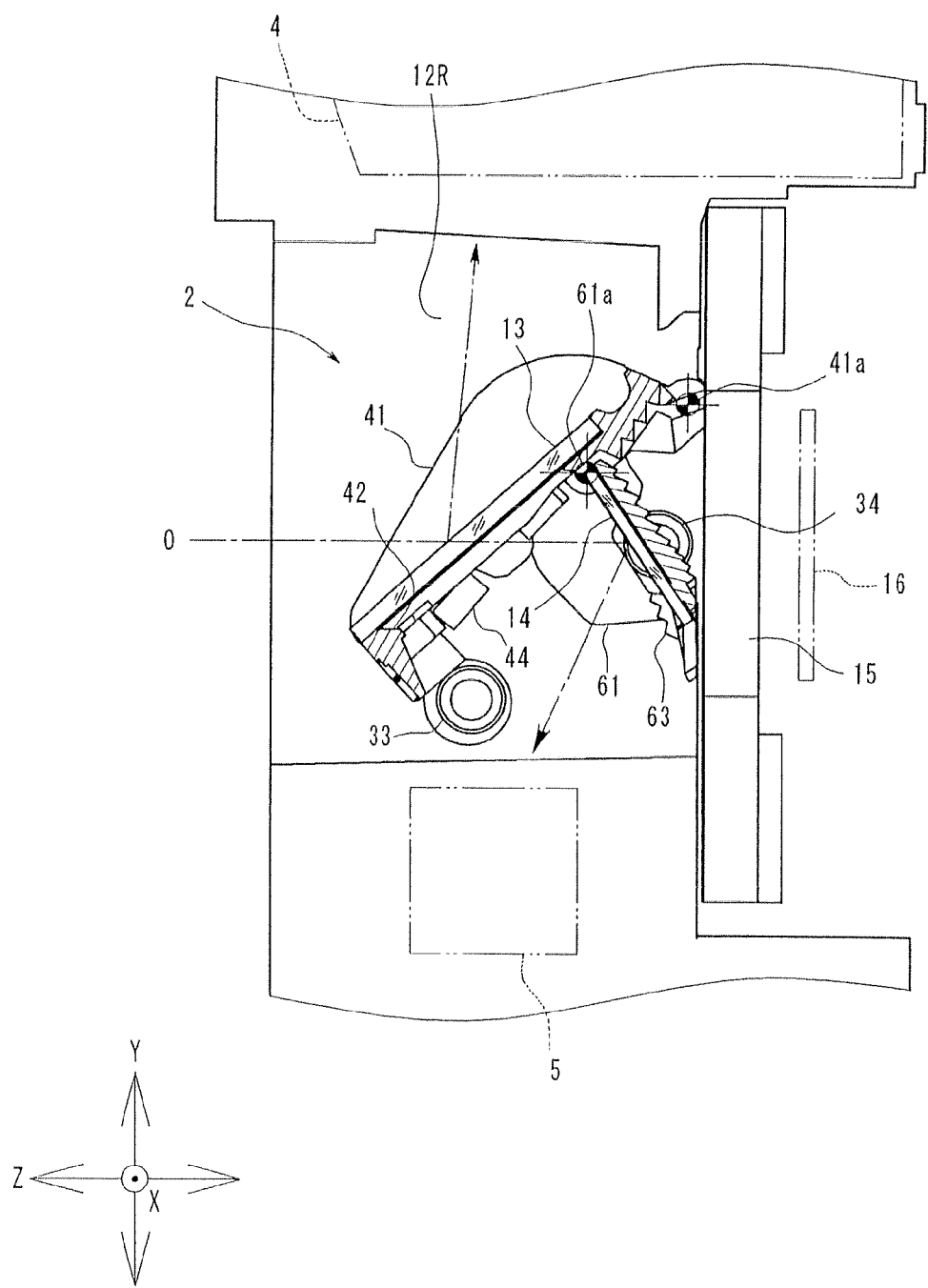
FIG. 2 is a side view of a mirror device at a mirror down position.
Figure 3:
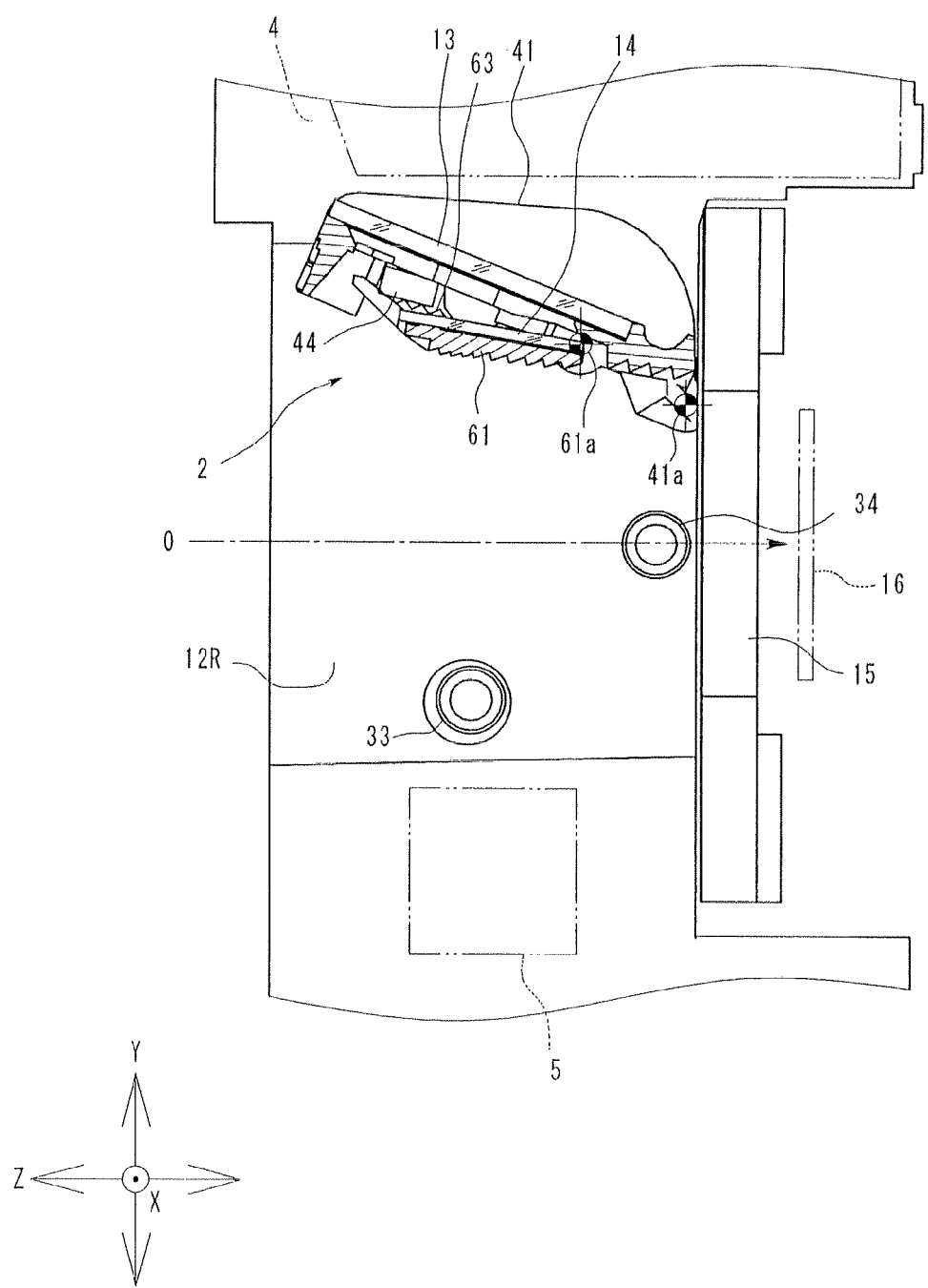
FIG. 3 is a side view of the mirror device at a mirror up position.
Figure 4:
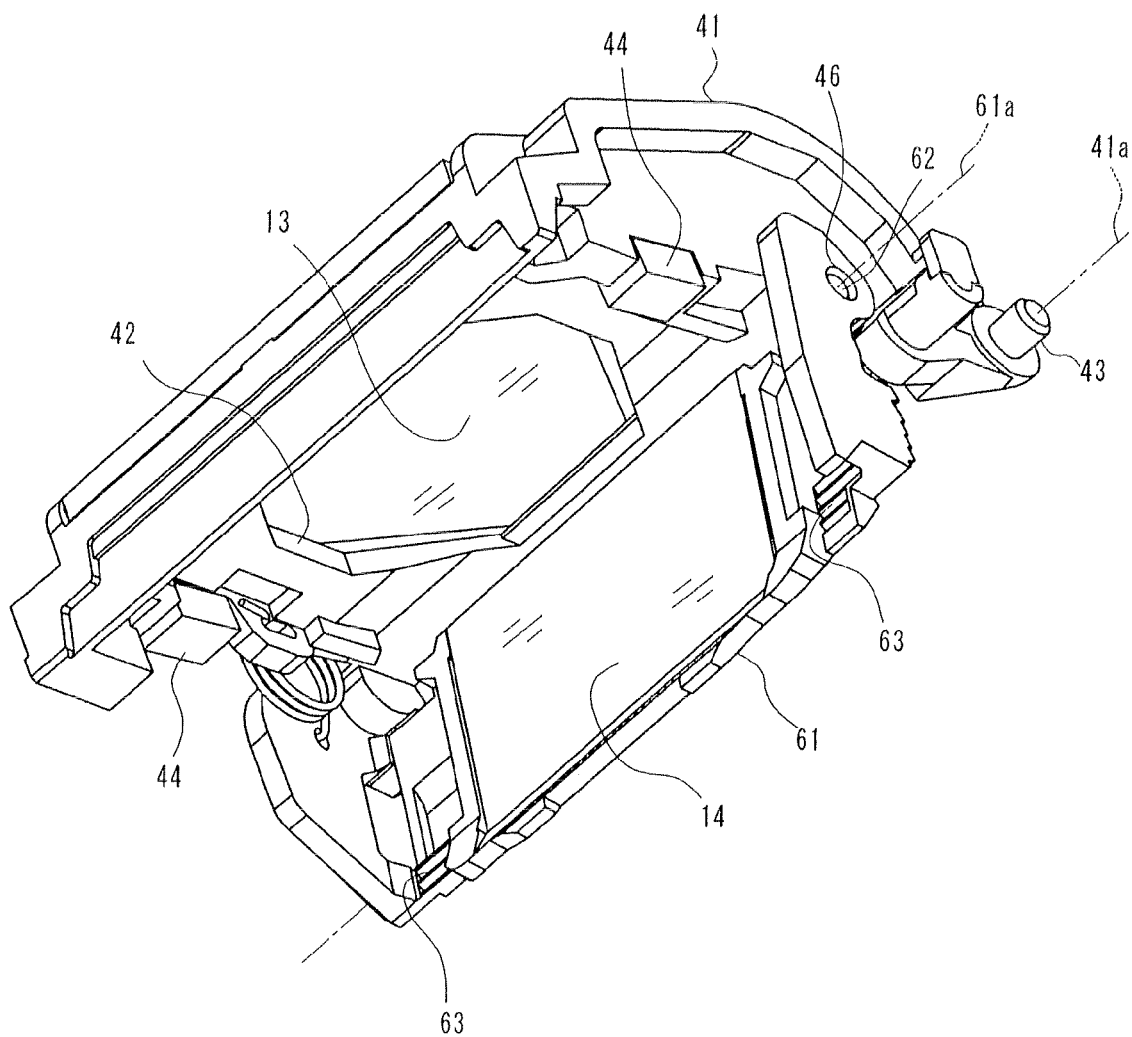
FIG. 4 is a view of the mirror device at the mirror down position seen from below.

FIG. 1 is a longitudinal cross-sectional view showing a configuration of a camera body of a single-lens reflex camera. FIG. 2 is a side view of a mirror device at a mirror down position. FIG. 3 is a side view of the mirror device at a mirror up position. FIG. 4 is a view of the mirror device at the mirror down position seen from below.

First, a schematic configuration of the single-lens reflex camera of the present embodiment will be explained with reference to FIG. 1 to FIG. 3.

A camera body 1 of the single-lens reflex camera is made up of a mirror device 2, an image pickup unit 3, a finder unit 4, a distance measuring unit 5, a display unit 6 and a strobe unit 7.

A body mount 11 is provided in front of the mirror device 2 and a taking lens 1a can be mounted in the camera body 1 in a detachable manner so as to be replaceable via the body mount 11.

Suppose a term "optical path" in the following explanations refers to an optical path of an object beam incident via the taking lens 1a when the taking lens 1a is mounted in the body mount 11 and any exception to this will be stated.

Furthermore, in the following explanations, as shown in FIG. 1, suppose a left-right direction of the single-lens reflex camera is an X direction, an up-down direction orthogonal to the X direction is a Y direction and a front-back direction orthogonal to the X and Y directions is a Z direction. The Z direction is a direction parallel to an optical axis O of the taking lens 1a (thickness direction of the camera body 1) and suppose the object side of the camera body 1 in the Z direction is a front side and a photographer side is a back side (rear side). Furthermore, the left-right direction in the X direction is shown by the direction of the camera body 1 viewed from the rear side. That is, the forward side of the sheet surface in FIG. 1 corresponds to the left side.

A mirror box 12 is disposed behind the body mount 11 on the optical path and the mirror device 2 is disposed in the mirror box 12 which will be described in detail later. The mirror device 2 is made up of two reflecting mirrors; a main mirror 13 and a sub-mirror 14, disposed in a manner movable forward or backward on the optical path of the object beam.

The main mirror 13 has a reflecting mirror surface and is supported by a frame-shaped main mirror holding frame 41 disposed in a manner pivotable around a main mirror rotation axis 41*a* in the mirror box. On the rear of the main mirror holding frame 41, a sub-mirror holding frame 61 is supported in a manner pivotable around a sub-mirror rotation axis 61*a*. The sub-mirror 14 is supported by the sub-mirror holding frame 61. The main mirror rotation axis 41*a* is quasi-parallel to the sub-mirror rotation axis 61*a* and both axes are disposed so as to abut on a plane orthogonal to the optical axis O of the taking lens 1*a*.

At least a part of the reflecting mirror surface of the main mirror 13 is configured as a semi-transmissive portion and an opening 42, which is a through hole, is formed in the main mirror holding frame 41 and the light beam passing through the semi-transmissive portion of the main mirror 13 is configured to pass toward the rear of the main mirror holding frame 41. The sub-mirror 14 is disposed on the optical axis of the light beam that passes through the semi-transmissive portion of the main mirror 13.

The main mirror 13 is positioned through a drive force by an actuator, cam and spring mechanism (not shown) to either one of a mirror down position which is a first position where the main mirror 13 is positioned advanced on the optical path of the object beam as shown in FIG. 2 and a mirror up position which is a second position retracted from the optical path of the object beam as shown in FIG. 3.

Furthermore, the sub-mirror 14 has a reflecting mirror surface and pivots around the sub-mirror rotation axis 61*a* in conjunction with the movement of the main mirror 13 through a cam and spring mechanism (not shown). When the main mirror 13 is at the mirror down position, sub-mirror 14 is positioned at a position where the light beam that passes through the semi-transmissive portion of the main mirror 13 is reflected toward a predetermined direction on the rear of the main mirror 13. Furthermore, when the main mirror 13 is at the mirror up position, the sub-mirror 14 is folded on the main mirror 13 side and positioned at a position retracted from the optical path of the object beam.

The image pickup unit 3, which is an image pickup section, is disposed in the rear on the optical path of the object beam when the main mirror 13 and sub-mirror 14 are at the mirror up position. The image pickup unit 3 is provided with a shutter apparatus 15 for controlling a passage time of the object beam and an image pickup device 16 disposed behind the shutter apparatus 15 on the optical path.

On the other hand, when the main mirror 13 and sub-mirror 14 are at the mirror down position, the finder unit 4, which is the observation optical system, is disposed on the optical path of the object beam reflected by the main mirror 13. The finder unit 4 has a focusing screen 17 disposed at a position optically equivalent to that of a light receiving surface of the image pickup device 16 with respect to the taking lens so as to form an object image and is further provided with a pentaprism 18 for converting the object image formed on the focusing screen 17 to an erecting image and an eyepiece optical system 19 for magnifying the optical image from the pentaprism 18 and guiding the optical image to an observer's eyes.

Furthermore, when the main mirror 13 and sub-mirror 14 are at an observation position, the distance measuring unit 5 is disposed on the optical path of the object beam reflected by the sub-mirror 14. The distance measuring unit 5 is provided with a condensing lens 21, a first mirror 22, a second mirror 23, a separator lens 24 and a distance measuring sensor 25 and configured to perform distance measurement for so-called TTL phase contrast AF.

The display unit 6 including a color liquid crystal display element or the like is disposed on the rear of the camera body 1 further behind the image pickup unit 3.

Furthermore, the strobe unit 7 for irradiating the object with illumination light is disposed above the pentaprism 18 in such a way that the strobe unit 7 pops up when in use or can be housed in the camera body 1 when not in use.

Next, a detailed configuration of the mirror device 2 will be explained with reference to FIG. 2 to FIG. 4.

As shown in FIG. 4, the main mirror 13 is held by the main mirror holding frame 41 and makes up a main mirror section. On the other hand, the sub-mirror 14 is held by the sub-mirror holding frame 61 and makes up a sub-mirror section.

The main mirror holding frame 41 has a pair of rotation shafts 43 protruding on the main mirror rotation axis 41*a* and the pair of rotation shafts 43 are pivotably supported by a pair of bearings provided on the left and right wall surfaces of the mirror box 12.

Furthermore, the main mirror holding frame 41 has a pair of support shafts 46 protruding on the sub-mirror rotation axis 61*a* and the support shafts 46 are fitted into bearing holes 62 provided in the sub-mirror holding frame 61. In this way, the sub-mirror holding frame 61 is supported in a manner pivotable around the support shafts 46, that is, around the sub-mirror rotation axis 61*a* on the rear surface side of the main mirror holding frame 41.

Furthermore, as described above, the main mirror holding frame 41 is provided with an opening 42, which is, for example, an octagonal through hole. Furthermore, at least part of the main mirror 13 is configured as a half mirror.

Furthermore, as shown in FIG. 2 and FIG. 3, a main mirror holding frame stopper 33 to position a descending bottom end of the main mirror holding frame 41 at the mirror down position and a sub-mirror holding frame stopper 34 to position a descending bottom end of the sub-mirror holding frame 61 at the mirror down position are provided so as to protrude on a right wall surface 12R of the mirror box 12.

Though not shown, a cushioning material made of an elastic body made of low rebound resilience resin or urethane foamed material having an excellent shock absorbing characteristic is disposed at a location where the main mirror holding frame 41 contacts the upper wall surface of the mirror box 12 at the mirror up position.

Furthermore, according to the present embodiment, a pair of contact sections 63 that come into contact with the main mirror holding frame 41 when the sub-mirror holding frame 61 is folded on the main mirror holding frame 41 side at the mirror up position are formed at the left and right ends at a distance from the sub-mirror rotation axis 61*a* of the sub-mirror holding frame 61.

A plurality of protruding threads having a triangular cross section are formed on the surface contacting the main mirror holding frame 41 of the contact section 63. In other words, at least one convex part having a ridge protruding on the main mirror holding frame 41 side is formed on the surface contacting the main mirror holding frame 41 of the contact section 63. The surface of the contact section 63 may also be coated with fluororesin or the like to improve non-viscosity.

On the other hand, a pair of cushioning materials 44 which are cushioning sections (cushioning means) made of low rebound resilience resin or urethane foamed material or the like having an excellent shock absorbing characteristic are fixed by adhesion to the locations of the main mirror holding frame 41 contacting the contact section 63 of the sub-mirror holding frame 61 at the mirror up position. SORBOSEIN (registered trademark) or the like is used as the cushioning materials 44.

In the above described present embodiment, when the main mirror section having the main mirror 13 and main mirror holding frame 41 are positioned at the mirror up position, the cushioning materials 44 are disposed in a region interposed between the sub-mirror section having the sub-mirror 14 and sub-mirror holding frame 61, and the main mirror section.

Therefore, according to the present embodiment, a shock produced when the sub-mirror holding frame 61 comes into contact with the main mirror holding frame 41 in a mirror up operation is reduced by the cushioning materials 44 and it is thereby possible to suppress the bounding of the sub-mirror holding frame 61.

That is, according to the present embodiment, the bounding of the sub-mirror 14 and sub-mirror holding frame 61 is suppressed and the waiting time in the mirror up operation when a picture is taken can thereby be reduced and the time after the photographer operates a release button until a shutter starts to operate, that is, a release time lag can be reduced. Furthermore, this allows the mirror device to be driven at high speed.

Moreover, according to the present embodiment, the convex part with ridges is formed on the surface of the contact section 63 that contacts the cushioning material 44 of the sub-mirror holding frame 61. That is, since only the ridges of the convex part contact the cushioning material 44 in the mirror up operation, the area of contact between the cushioning material 44 and the contact section 63 is small and the contact section 63 never sticks to the cushioning material 44 made of a flexible material.

For example, a single-lens reflex digital camera capable of a long-time exposure operation and a live view operation may continue to operate under a mirror up condition for a long time, but the present embodiment can prevent the sub-mirror holding frame 61 from sticking to the cushioning materials provided for the main mirror holding frame 41 even in a long time mirror up operation and allows a reliable operation.

The above described embodiment adopts a configuration where the main mirror 13 and the sub-mirror 14 are held by the main mirror holding frame 41 and the sub-mirror holding frame 61 respectively, but the main mirror 13 and the sub-mirror 14 need only to be configured so as to be able to direct the object beam differently depending on forward or backward movement on the optical path and such a configuration is not limited to the present embodiment. For example, the main mirror holding frame and the main mirror may also be molded in one piece.

Furthermore, the present embodiment adopts the configuration where the cushioning materials 44 are fixed to the main mirror holding frame 41 and the contact sections 63 are formed in the sub-mirror holding frame 61, but it goes without saying that similar effects can also be obtained with a reverse arrangement, that is, a configuration in which the cushioning materials 44 are fixed to the sub-mirror holding frame 61 and the contact sections 63 having ridges are formed in the main mirror holding frame 41.

Furthermore, according to the present embodiment, the contact section has the protruding threads having a linear ridge, a cross section of which is triangular, that is, a section in which a so-called knurled convexo-concave shape is formed, but the contact section is not limited to the present embodiment.

For example, the surface shape of the contact section 63 may also be a convexo-concave shape having one or a plurality of ridges of curve, closed curve, rectangle, polygon or the like in a plan view and the ridge may have a semicircular vertex instead of a triangular vertex. Furthermore, the surface shape of the contact section 63 may also be a so-called file-grit shape having an array of a plurality of pyramids.

The present invention is not limited to the above described embodiments, but can be modified as appropriate within a scope not departing from the spirit or thought of the present invention that can be read from the claims of the patent application and the whole specification and such a modified camera is also included in the technical scope of the present invention.

The single-lens reflex camera according to the present invention is not limited to the lens replacement type digital camera explained in the above described embodiment, but, needless to say, may be a single-lens reflex camera for taking pictures using a film or a single-lens reflex camera in which a taking lens is integrated with the body.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A mirror device of a single-lens reflex camera comprising:
    a main mirror section having a reflecting mirror surface that moves to a first position for reflecting an object beam to an observation optical system and to a second position retracted from the object beam;
    a sub-mirror section having a reflecting mirror surface located, in conjunction with movement of the main mirror section, at a position apart from the main mirror section when the main mirror section is located at the first position and at a position retracted from the object beam together with the main mirror section when the main mirror section is located at the second position; and
    a cushioning section interposed between the sub-mirror section and the main mirror section when the main mirror section moves from the first position to the second position,
    wherein the sub-mirror section comprises a contact section that contacts the cushioning section when the main mirror section is at the second position, ridges are formed in the contact section and the ridges come into contact with the cushioning section.

2. The mirror device of a single-lens reflex camera according to claim 1, wherein the cushioning section is made of a shock absorbing material and fixed to the main mirror section.

3. The mirror device of a single-lens reflex camera according to claim 1, wherein the cushioning section is made of a shock absorbing material and fixed to the sub-mirror section.

4. A mirror device of a single-lens reflex camera comprising:
    a main mirror section having a reflecting mirror surface that moves to a first position for reflecting an object beam to an observation optical system and to a second position retracted from the object beam;
    a sub-mirror section having a reflecting mirror surface located, in conjunction with movement of the main mirror section, at a position apart from the main mirror section when the main mirror section is located at the first position and at a position retracted from the object beam together with the main mirror section when the main mirror section is located at the second position; and a cushioning section interposed between the sub-mirror section and the main mirror section when the main mirror section moves from the first position to the second position, wherein the main mirror section comprises a contact section that contacts the cushioning section when the main mirror section is at the second position, ridges are formed in the contact section and the ridges come into contact with the cushioning section.

5. A mirror device of a single-lens reflex camera comprising:
- a main mirror section having a reflecting mirror surface that moves to a first position for reflecting an object beam to an observation optical system and to a second position retracted from the object beam;
- a sub-mirror section having a reflecting mirror surface located, in conjunction with movement of the main mirror section, at a position apart from the main mirror section when the main mirror section is located at the first position and at a position retracted from the object beam together with the main mirror section when the main mirror section is located at the second position; and
- a cushioning section interposed between the sub-mirror section and the main mirror section when the main mirror section moves from the first position to the second position, wherein the cushioning section is made of a shock absorbing material and fixed to the sub-mirror section, and wherein the main mirror section comprises a contact section that contacts the cushioning section when the main mirror section is at the second position, ridges are formed in the contact section and the ridges come into contact with the cushioning section.

* * * * *